(12) United States Patent
Koch et al.

(10) Patent No.: US 8,288,485 B2
(45) Date of Patent: Oct. 16, 2012

(54) ANHYDROUS DISPERSION OF POLYURETHANE (METH) ACRYLATE PARTICLES IN A REACTIVE DILUENT

(75) Inventors: Klaus-Uwe Koch, Recklinghausen (DE); Daniele Rutz, Zurich (CH)

(73) Assignee: Dritte Patentportfolio Betelligungsgesellschaft mbH & Co. KG, Waltersdorf (DE)

( * ) Notice: Subject to any disclaimer, the term of this patent is extended or adjusted under 35 U.S.C. 154(b) by 677 days.

(21) Appl. No.: 11/989,481

(22) PCT Filed: Jul. 14, 2006

(86) PCT No.: PCT/EP2006/006886
§ 371 (c)(1),
(2), (4) Date: Dec. 9, 2008

(87) PCT Pub. No.: WO2007/012412
PCT Pub. Date: Feb. 1, 2007

(65) Prior Publication Data
US 2009/0118438 A1    May 7, 2009

(30) Foreign Application Priority Data

Jul. 25, 2005 (DE) .......................... 10 2005 035 235

(51) Int. Cl.
C08L 75/00 (2006.01)
C08L 75/06 (2006.01)
C08G 18/62 (2006.01)
(52) U.S. Cl. .......... 525/454; 525/455; 525/458; 528/48; 528/75; 528/85
(58) Field of Classification Search ................. 525/454, 525/455, 458; 528/48, 75, 85
See application file for complete search history.

(56) References Cited

U.S. PATENT DOCUMENTS
6,787,596 B1 * 9/2004 Maier et al. .................. 524/507
* cited by examiner

*Primary Examiner* — Ana Woodward
(74) *Attorney, Agent, or Firm* — Panitch Schwarze Belisario & Nadel LLP (57) ABSTRACT

Disclosed are anhydrous transparent dispersions of polyurethane(meth)acrylate particles in a reactive diluent, which can be obtained by reacting a polyisocyanate with at least one polyol and a nucleophilically functionalized (meth)acrylic acid ester in the reactive diluent. The inventive dispersions are characterized in that the polyurethane(meth)acrylate particles have an average diamert of less than 40 nm. The invention further relates to a method for producing such dispersions, the use thereof as an adhesive, cut glass, or impact resistance modifier, and a molded article made from said dispersion.

22 Claims, 3 Drawing Sheets

Figure 1:
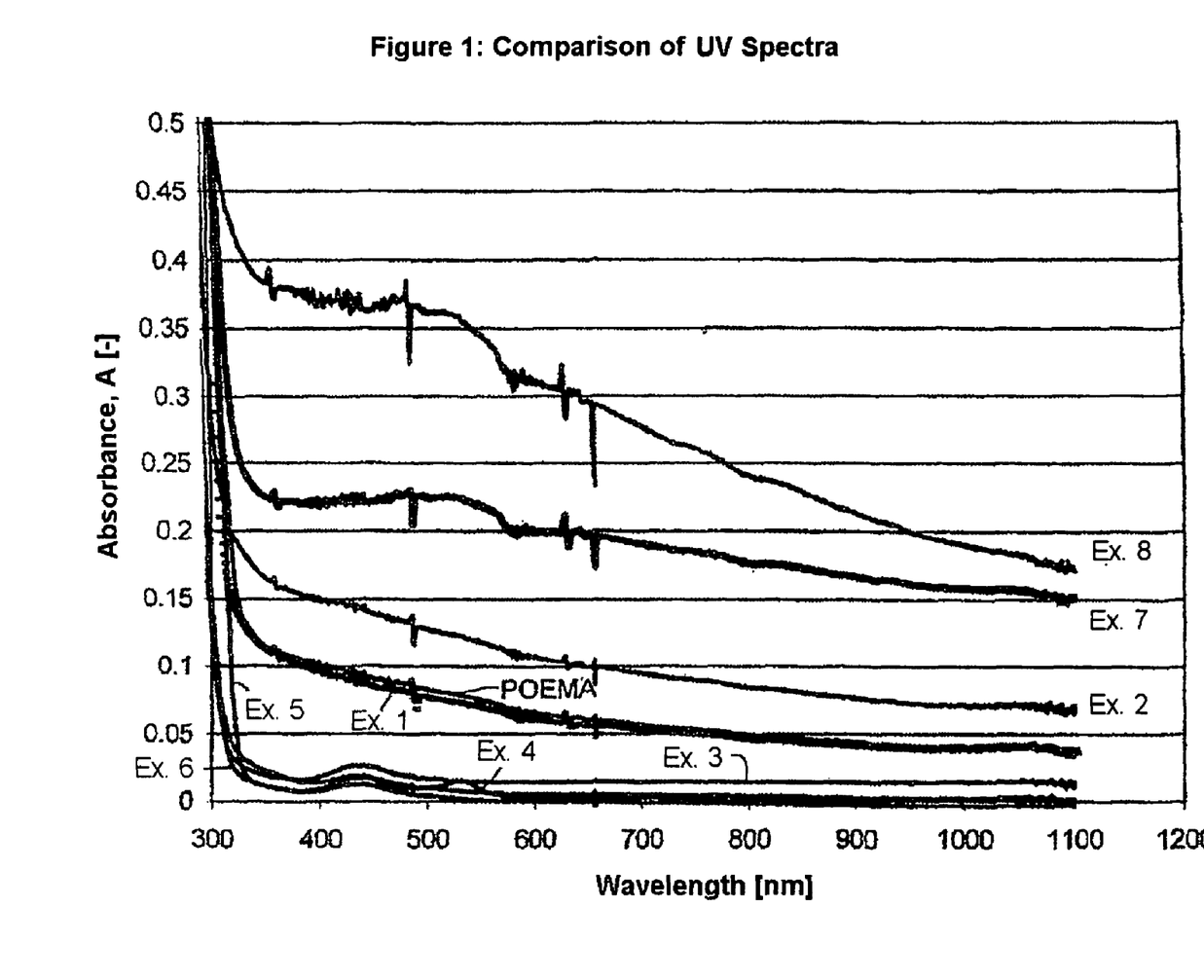

Figure 1: Comparison of UV Spectra

Figure 2:
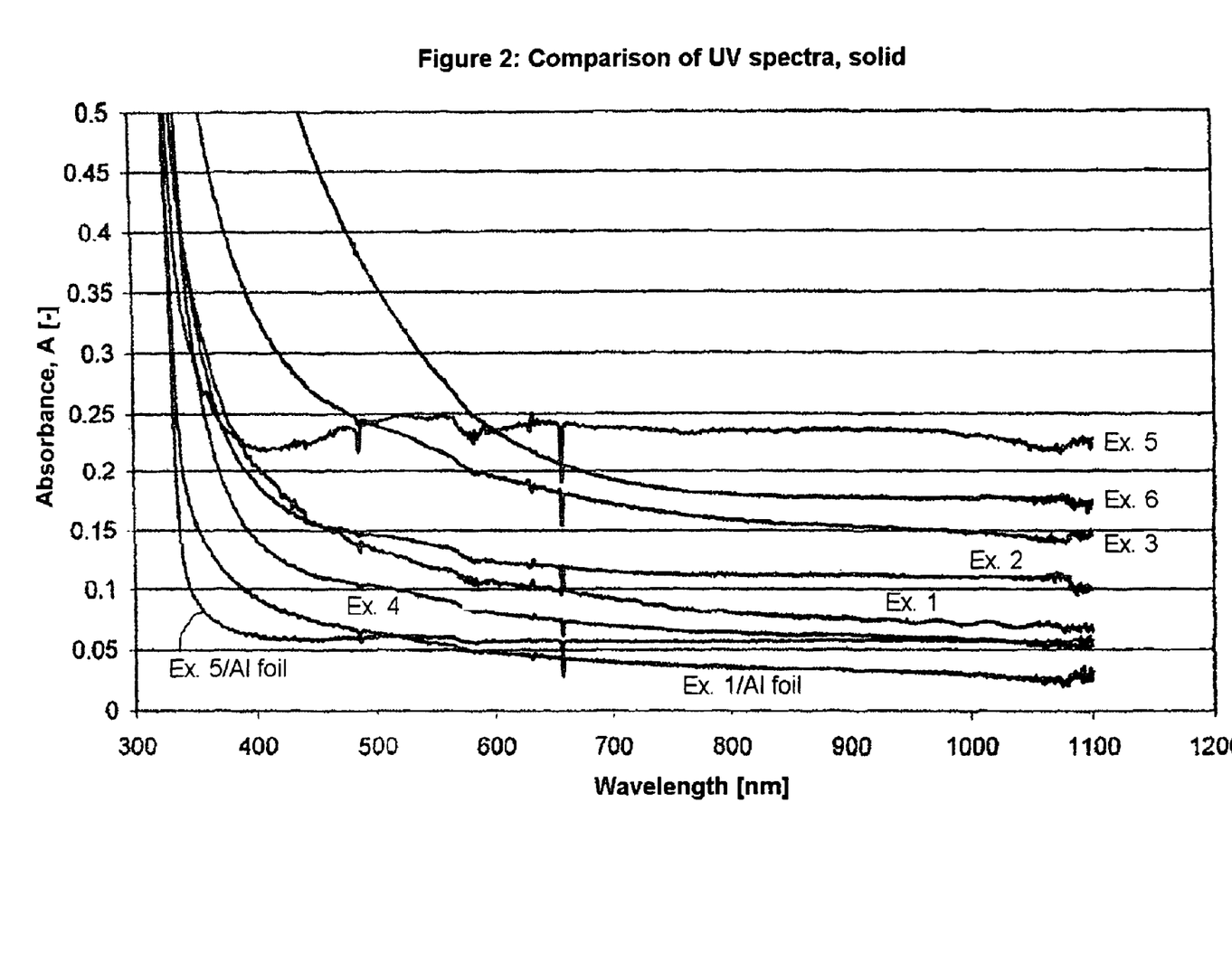

Figure 2: Comparison of UV spectra, solid

Figure 3: Viscosity

ANHYDROUS DISPERSION OF POLYURETHANE (METH) ACRYLATE PARTICLES IN A REACTIVE DILUENT

CROSS REFERENCE TO RELATED APPLICATIONS

The present application is a U.S. National Phase filing under 35 U.S.C. §371 of International Application No. PCT/EP2006/006886, filed Jul. 14, 2006, which was published in the German language as WO 2007/012412 on Feb. 1, 2007, and which claims priority to German Patent Application No. 10 2005 035 235.9, filed Jul. 25, 2005, the disclosures of each of which are incorporated by reference herein in their entireties.

The present invention relates to particularly finely particulate nonaqueous dispersions of polyurethane(meth)acrylate particles which are suitable for application as an adhesive, cast glass or impact modifier, and to a process for preparing such dispersions.

Nonaqueous polyurethane dispersions have acquired increasing importance in recent years. They are employed especially as coating, coupling, and adhesive bonding compositions.

The specifications DE 3248132, DE 3513248, EP 0320690, and EP 0318939 describe nonaqueous dispersions of polyurethanes for predominant use as coating compositions. The solvent is composed of a hydrocarbon. Curing takes place by evaporation of the solvent, to form a thin film of the previously dispersed polyurethane particles. The dispersion from DE 3248132 is described as being opaque (impervious to light).

A need exists, however, for adhesive systems which can be used to produce a completely transparent adhesive bond. This is particularly significant in the context of the adhesive bonding of glasses for which it is intended that the transparency should be retained in the end product as well. It is also important, however, for the cured adhesive to exceed a threshold impact strength, so as to give a mechanically robust adhesive bond.

In light of the prior art it was an object of the present invention to specify a polyurethane dispersion-based adhesive formulation which complies with the properties identified above and which, in addition to a high transparency, and after curing, also has a high impact strength and tensile shear strength.

A further object was to provide a dispersion obtainable by a relatively small number of components, in order to make its preparation more economic. For instance, the addition of stabilizer should be avoided as far as possible, without detriment to the stability of the dispersion as a result.

A further object was to provide a dispersion which can be cured directly to form an adhesive bond or else a casting.

In addition to the properties identified, the invention ought also to enable the dispersion to include a high polyurethane solids fraction, thereby allowing the impact strength properties to be optimized. At the same time the handling and processing properties ought to be good.

A dispersion according to the invention ought to be prepared with components which are readily available commercially at favorable prices.

The objects described above, and also further objects which, although not stated in words, are nevertheless obviously derivable from the circumstances discussed herein, or which arise automatically out of those circumstances, are achieved with a dispersion according to claim 1.

Dependant claims 2 to 10 specify advantageous embodiments of the dispersion. A process for preparing the dispersion of the invention is specified in claims 11 to 15. Claims 16 to 18 relate to uses for which the dispersion of the invention is suited.

Provided by the present invention is a nonaqueous transparent dispersion of polyurethane(meth)acrylate particles in a reactive diluent, obtainable by reacting a polyisocyanate with at least one polyol and a nucleophilically functionalized (meth)acrylic ester in the reactive diluent, and characterized in that the polyurethane(meth)acrylate particles have an average diameter of less than 40 nm.

A dispersion is provided of an impact modifier comprising polyurethane(meth)acrylate particles in a reactive diluent, the dispersion being transparent and remaining transparent after the reactive diluent has been cured.

The dispersion of the invention can be cured directly to form an adhesive bond or a casting. Apart from a curing initiator, there are no further substances at all that must be added. It will be appreciated, however, that it is possible to mix the dispersion of the invention with conventional adhesive systems or casting compounds, and then to cure the mixture.

At the same time, as a result of the polyurethane(meth)acrylate particles it contains, the dispersion cured to a solid possesses outstanding impact strength properties and outstanding other mechanical properties, more particularly a high tensile shear strength.

A further advantage is that there is no need to add stabilizer to the dispersion of the invention for the purpose of stabilizing the particles in the liquid phase.

On account of the described tensile shear strength and transparency, the dispersion is outstandingly suitable for adhesive applications where high transparency is a criterion. It can be used advantageously, for example, as an adhesive for glass.

As a consequence of the transparency and the outstanding impact strength, the dispersion is also suitable as a casting compound for producing transparent products of high impact strength.

Moreover, the dispersion described is stable, and hence capable of storage, over a prolonged period, i.e., at least two months, at room temperature.

As compared with the solutions of polyurethane impact modifiers in a reactive diluent that have been much used to date, a feature of the dispersion of the invention is that it can contain, based on the total weight of the composition, higher fractions of solid polyurethane (hereinbelow: PU) than in the case of solutions of PU in reactive diluent. In the latter solutions, the fraction of PU is greatly restricted by the sharp rise in viscosity. Accordingly, it is possible to achieve a high solids fraction of PU impact modifier at the same time as achieving good handling and processing properties.

In contradistinction to the abovementioned dispersions from the prior art, the reactive diluent in the present invention is an important component for the production of an adhesive bond, since it is cured.

The term "nucleophilically functionalized (meth)acrylic esters" in the context of this invention denotes a (meth)acrylic ester which in its radical originating from the alcohol carries a nucleophilic functional group which reacts with free isocyanate groups. Preferred nucleophilic groups are hydroxyl, amino, and mercapto groups. A hydroxyl group is particularly preferred. The particularly preferred nucleophilically functionalized (meth)acrylic esters with a hydroxyl functionality are referred to as "hydroxy-functional (meth)acrylic esters".

A further description of the nucleophilically functionalized (meth)acrylic esters is given later on below.

The term "polyurethane(meth)acrylate" in the context of this invention denotes a polyurethane whose free terminal isocyanate groups have been reacted with a nucleophilically functionalized (meth)acrylic ester. In this case the isocyanate groups react with the nucleophilic group of the nucleophilically functionalized (meth)acrylic ester, e.g., hydroxyl, amino or mercapto, to form terminal, ethylenically unsaturated functionalities derived from (meth)acrylates. The (meth)acrylic acid expression herein refers to methacrylic acid, to acrylic acid, and to mixtures of these acids. Because the nucleophilically functionalized (meth)acrylic esters react with the free isocyanate groups of the polyurethane, in other words "capping" them, they are also referred to as "capping reagents".

The term "reactive diluents" in accordance with the invention means a substance which contains at least one ethylenic double bond. The reactive diluent fulfills the following functions:
1) the reactive diluent serves as a liquid reaction medium for the reaction of polyisocyanate with at least one polyol and a nucleophilically functionalized (meth)acrylic ester. The reactive diluent does not participate in said reaction.
2) When the reaction described in 1) is at an end, the reactive diluent is the liquid dispersion medium for the polyurethane(meth)acrylate particles formed.
3) The reactive diluent is curable by polymerization in a further step, the previously formed polyurethane(meth)acrylate particles being embedded in the cured reactive diluent at the end of the reaction.

The product obtained when step 3) is over is also referred to in the context of this invention as "cured dispersion".

The polyurethane(meth)acrylate particles are embedded in the cured dispersion by polymerizational incorporation of the terminal, ethylenically unsaturated functionalities of the particles into the macromolecules of the polymerized matrix, the term "polymerized matrix" referring to the polymerized reactive diluent.

A suitable reactive diluent is in principle any substance that is able to fulfill the functions described above. A further condition is that the reactive diluent must be transparent both before and after its curing.

On the one hand, vinylaromatic monomers are suitable reactive diluents. Preference is given to styrene and substituted styrenes, such as substituted styrenes having an alkyl substituent in the side chain, such as α-methylstyrene and α-ethylstyrene, substituted styrenes having an alkyl substituent on the ring, such as vinyltoluene, and halogenated styrenes, such as monochlorostyrenes, dichlorostyrenes, tribromostyrenes, and tetrabromostyrenes, for example.

The most preferred reactive diluents are (meth)acrylates. Meth(acrylates) for the purposes of the invention comprehend both methacrylates and acrylates. The (meth)acrylates may contain one or more double bonds. (Meth)acrylates which contain two or more reactive double bonds are referred to in the context of the invention as polyfunctional (meth)acrylates.

The radical of the (meth)acrylates that originates from the alcohol may contain heteroatoms, in the form for example of ether, alcohol, carboxylic acid, ester, and urethane groups.

(Meth)acrylates which can be employed with particular success as reactive diluents in the context of the invention include the following:

alkyl(meth)acrylates which derive from saturated alcohols, such as methyl(meth)acrylate, ethyl(meth)acrylate, isopropyl (meth)acrylate, n-propyl(meth)acrylate, butyl(meth)acrylate, pentyl(meth)acrylate, n-hexyl(meth)acrylate, n-octyl (meth)acrylate, n-decyl(meth)acrylate, isooctyl(meth)acrylate, tetradecyl(meth)acrylate, etc.;

alcohol(meth)acrylates which derive from unsaturated alcohols, such as oleyl(meth)acrylate, 2-propynyl(meth)acrylate, allyl(meth)acrylate, vinyl(meth)acrylate etc.;

amides and nitriles of (meth)acrylic acid, such as N-(3-dimethylaminopropyl)(meth)acrylamide, N-(diethylphosphono)(meth)acrylamide, N-(3-dibutylaminopropyl)(meth)acrylamide, N-tert-butyl-N-(diethylphosphono)(meth)acrylamide, N,N-bis(2-diethylaminoethyl)(meth)acrylamide, (meth)acryloylamidoacetonitrile, N-(methoxymethyl)(meth)acrylamide, N-acetyl(meth)acrylamide, N-(dimethylaminoethyl)(meth)acrylamide, N-methyl-N-phenyl(meth)acrylamide, N,N-diethyl(meth)acrylamide, N-methyl(meth)acrylamide, N,N-dimethyl(meth)acrylamide, N-isopropyl(meth)acrylamide;

aminoalkyl(meth)acrylates, such as tris(2-(meth)acryloyloxyethyl)amine, N-methylformamideoethyl(meth)acrylate, 3-diethylaminopropyl(meth)acrylate, 2-ureidoethyl(meth)acrylate;

other nitrogen-containing (meth)acrylates, such as N-((meth)acryloyloxyethyl)diisobutylketimine, 2-(meth)acryloyloxyethylmethylcyanamide, cyanomethyl(meth)acrylate, 2,2,6,6-tetramethylpiperidyl(meth)acrylate;

aryl(meth)acrylates, such as nonylphenyl(meth)acrylate, (benzyl(meth)acrylate, 2-naphthyl(meth)acrylate, phenyl (meth)acrylate, it being possible for the aryl radicals in each case to be unsubstituted or substituted up to four times;

carbonyl-containing (meth)acrylates, such as 2-carboxyethyl (meth)acrylate, carboxymethyl(meth)acrylate, N-(2-(meth)acryloyloxyethyl)-2-pyrrolidinone, N-(3-(meth)acryloyloxypropyl)-2-pyrrolidinone, N-(meth)acryloylmorpholine, oxazolidinylethyl(meth)acrylate, N-((meth)acryloyloxy)formamide, acetonyl(meth)acrylate, N-(meth)acryloyl-2-pyrrolidinone;

cycloalkyl(meth)acrylates, such as cyclobutyl(meth)acrylate, cyclopentyl(meth)acrylate, cyclohexyl(meth)acrylate, cyclooctyl(meth)acrylate, 3-vinylcyclohexyl(meth)acrylate, 3,3,5-trimethylcyclohexyl(meth)acrylate, bornyl(meth)acrylate, cyclopenta-2,4-dienyl(meth)acrylate, isobornyl(meth) acrylate, 1-methylcyclohexyl(meth)acrylate;

glycol di(meth)acrylates, such as 1,4-butanediol di(meth)acrylate, 1,3-butanediol di(meth)acrylate, triethylene glycol di(meth)acrylate, 2,5-dimethyl-1,6-hexanediol di(meth)acrylate, 1,10-decanediol di(meth)acrylate, 1,2-propanediol di(meth)acrylate, diethylene glycol di(meth)acrylate, ethylene glycol di(meth)acrylate;

(meth)acrylates of ether alcohols, such as tetrahydrofurfuryl (meth)acrylate, vinyloxyethoxyethyl(meth)acrylate, methoxyethoxyethyl(meth)acrylate, 1-butoxypropyl(meth)acrylate, 1-methyl-(2-vinyloxy)ethyl(meth)acrylate, cyclohexyloxymethyl(meth)acrylate, methoxymethoxyethyl (meth)acrylate, benzyloxymethyl(meth)acrylate, phenyloxyethyl methacrylate, furfuryl(meth)acrylate, 2-butoxyethyl (meth)acrylate, 2-ethoxyethoxymethyl(meth)acrylate, 2-ethoxyethyl(meth)acrylate, allyloxymethyl(meth)acrylate, 1-ethoxybutyl(meth)acrylate, methoxymethyl(meth)acrylate, 1-ethoxyethyl(meth)acrylate, ethoxymethyl(meth)acrylate;

(meth)acrylates of halogenated alcohols, such as 2,3-dibromopropyl(meth)acrylate, 4-bromophenyl(meth)acrylate, 1,3-dichloro-2-propyl(meth)acrylate, 2-bromoethyl(meth) acrylate, 2-iodoethyl(meth)acrylate, chloromethyl(meth)acrylate;

oxiranyl(meth)acrylates, such as 10,11-epoxyundecyl(meth) acrylate, 2,3-epoxycyclohexyl(meth)acrylate, 2,3-epoxybutyl(meth)acrylate, 3,4-epoxybutyl(meth)acrylate, glycidyl (meth)acrylate; phosphorus-, boron- and/or silicon-containing (meth)acrylates, such as 2-(dibutylphosphono) ethyl(meth)acrylate, 2,3-butylene(meth)acryloylethyl borate, 2-(dimethylphosphato)propyl(meth)acrylate, methyldiethoxy(meth)acryloylethoxysilane, 2-(ethylenephosphito)propyl(meth)acrylate, dimethylphosphinomethyl (meth)acrylate, dimethylphosphonoethyl(meth)acrylate, diethyl(meth)acryloyl phosphonate, diethylphosphatoethyl (meth)acrylate, dipropyl(meth)acryloyl phosphate;

sulfur-containing (meth)acrylates, such as thiomethyl(meth) acrylate, thiocyclohexyl(meth)acrylate, thiophenyl(meth) acrylate, ethylsulfinylethyl(meth)acrylate, 4-thiocyanatobutyl(meth)acrylate, ethylsulfonylethyl(meth)acrylate, thiocyanatomethyl(meth)acrylate, methylsulfinylmethyl (meth)acrylate, bis((meth)acryloyloxyethyl)sulfide;

tri(meth)acrylates, such as trimethyloylpropane tri(meth) acrylate, glycerol tri(meth)acrylate;

tetra(meth)acrylates, such as pentaerythritol tetra(meth)acrylate.

The stated compounds can be employed alone or in mixtures of two or more as reactive diluents.

Particularly preferred reactive diluent components in the context of the invention include alkyl(meth)acrylates which are derived from saturated alcohols, such as methyl(meth) acrylate, ethyl(meth)acrylate isopropyl(meth)acrylate, n-propyl(meth)acrylate, butyl(meth)acrylate, pentyl(meth) acrylate, n-hexyl(meth)acrylate, n-octyl(meth)acrylate, n-decyl(meth)acrylate, isooctyl(meth)acrylate, tetradecyl (meth)acrylate, etc., allyl acrylate, phenyloxyethyl methacrylate, allyl(meth)acrylate, glycidyl(meth)acrylate, neopentyl (meth)acrylate, isobornyl(meth)acrylate, cyclohexyl(meth) acrylate, tert-butyl(meth)acrylate, tetrahydrofurfuryl(meth) acrylate, maleic acid mono-2-(meth)acryloyloxyethyl ester, (7,7,9-trimethyl-4,13-dioxo-3,14-dioxa-12-diazahexanedecane-1,16-diol di(meth)acrylate), 3-[2-((meth)acryloyloxy) ethoxy-carbonyl]-propionic acid or mixtures thereof.

The most preferred reactive diluents are methyl methacrylate (MMA) and 2-phenyloxyethyl methacrylate (POEMA).

Polar monomers, such as those with hydroxyl groups, for example, can be used to improve the adhesion. In that case, however, it must be borne in mind that monomers of this kind which enter into reactions with isocyanates, hydroxyl-containing monomers for example, cannot be added to the dispersion until after the polyaddition step. Expediently, however, the amount of such polar monomers is limited, in order not to bring about an unnecessary increase in the sensitivity toward water swelling. With particular preference, polar monomers, more particularly hydroxyl-containing monomers, are restricted to an amount of 0.1% to 20% by weight, based on the total weight of the reactive diluent.

In the reactive diluent there may in addition also be methacrylates which function as crosslinking agents. These include difunctional, trifunctional and higher polyfunctional compounds, among others. Particular preference is enjoyed by difunctional (meth)acrylates and also trifunctional (meth) acrylates.

(a) difunctional (meth)acrylates

Compounds of the general formula:

in which R is hydrogen or methyl and n is a positive integer between 3 and 20, such as, for example, the di(meth) acrylate of propanediol, butanediol, hexanediol, octanediol, nonanediol, decanediol, and eicosanediol; compounds of the general formula:

in which R is hydrogen or methyl and n is a positive integer between 1 and 14, such as, for example, the di(meth) acrylate of ethylene glycol, diethylene glycol, triethylene glycol, tetraethylene glycol, dodecaethylene glycol, tetradecaethylene glycol, propylene glycol, dipropylene glycol, and tetradecapropylene glycol; and glycerol di(meth)acrylate, 2,2'-bis[p-(γ-methacryloyloxy-β-hydroxypropoxy)phenylpropane] or bis-GMA, bisphenol A dimethacrylate, neopentyl glycol di(meth)acrylate, 2,2'-di(4-methacryloyloxypolyethoxyphenyl)propane having 2 to 10 ethoxy groups per molecule, and 1,2-bis (3-methacryoyloxy-2-hydroxypropoxy)butane.

(b) Trifunctional or higher polyfunctional (meth)acrylates

Trimethylolpropane tri(meth)acrylates and pentaerythritol tetra(meth)acrylate.

The stated crosslinking monomers are used either alone or in the form of a mixture of two or more monomers.

Further polyfunctional (meth)acrylates which can be present in the reactive diluent are 2,2-bis-4-(3-methacryloxy-2-hydroxypropoxy)phenylpropane (bis-GMA) and/or 7,7,9-trimethyl-4,13-dioxo-3,14-dioxa-5,12-diazahexadecane 1,16-dioxydimethacrylate (UDMA), and also Diacryl 121 (AKZO) and similar products, of the general formula $R^1, R^2$=H, alkyl (preferably H, $CH_3$)
$R^3, R^4$=alkyl or with n=1 to 100 and m=1, 2 or 3, for example.

The fraction of the polyfunctional (meth)acrylates, taking into account the details above, is in principle unlimited. It has been found, however, that their fraction ought preferably to be limited to 40% by weight, based on the weight of the reactive diluent, since otherwise mechanical properties or the polymerization behavior may be adversely affected.

A reactive diluent based on (meth)acrylates may also, furthermore, contain other comonomers which are copolymerizable with abovementioned (meth)acrylates. Such comonomers include vinyl esters, vinyl chloride, vinylidene chloride, vinyl acetate, styrene, substituted styrenes having an alkyl substituent in the side chain, such as α-methylstyrene and α-ethylstyrene, substituted styrenes having an alkyl substituent on the ring, such as vinyltoluene and p-methylstyrene, halogenated styrenes, such as monochlorostyrenes, dichlorostyrenes, tribromostyrenes, and tetrabromostyrenes, vinyl and isopropenyl ethers, maleic acid derivatives, such as maleic anhydride, methyl maleic anhydride, maleimide, methylmaleimide, phenylmaleimide, and cyclohexylmaleimide, and dienes, such as 1,3-butadiene, divinylbenzene, diallyl phthalate, and 1,4-butanediol divinyl ether, for example.

The fraction of the comonomers is restricted to 40% by weight of the reactive diluent, since otherwise the mechanical properties of the cured dispersion may be adversely affected. The fraction of the vinylaromatics in this amount is limited to 30% by weight of the reactive diluent, since higher fractions can lead to separation of the system and hence to clouding.

All of the abovementioned monomers are available commercially.

With particular preference, accordingly, the reactive diluent is composed of
a1) 60 to 100 parts by weight of (meth)acrylate
a2) 0 to 40 parts by weight of polyfunctional (meth)acrylate
a3) 0 to 40 parts by weight of comonomer.

In the context of the present invention, polyisocyanates are low molecular mass compounds which contain two or more isocyanate groups in their molecule. In the present invention it is preferred to use diisocyanates.

In particular embodiments, however, it is also possible in addition to add polyisocyanates having three or more isocyanate groups. The choice of the fraction of polyisocyanates having 3 or more isocyanate groups allows the spectrum of breaking extension and tensile strength properties to be adjusted. The higher the fraction of compounds having three or more functionalities, the greater the tensile strength. In this case, however, there is a sharp reduction in the breaking elongation. It has been found, accordingly, that the fraction of these polyisocyanates having three or more functionalities ought not to be greater than 10% by weight, preferably not more than 5% by weight, based on the total mass of polyisocyanates.

The polyisocyanates which can be used in the present invention include, among others, 2,4-toluene diisocyanate, 2,6-toluene diisocyanate, 4,4'-diphenylmethane diisocyanate (4,4'-methylenediphenyl diisocyanate, MDI), 4,4'-dicyclohexyl diisocyanate, 2,4'-methylene dicyclohexyl diisocyanate, 4,4'-methylenedicyclohexyl diisocyanate, meta- and para-tetramethylxylene diisocyanate, 3-isocyanatomethyl-3,5,5-trimethylcyclohexyl isocyanate (isophorone diisocyanate), hexamethylene diisocyanate, 1,5-naphthylene diisocyanate, dianisidine diisocyanate, di(2-isocyanatoethyl) bicyclo[2.2.1]hept-5-en-2,3-dicarboxylate, 2,2,4- and 2,4,4-trimethylene-hexamethylene diisocyanate, triphenylmethane 4,4',4"-triisocyanate, tris(4-isocyanatophenyl)thiophosphate, and mixtures thereof.

Suitable polyisocyanates can also be obtained, for example, by the reaction of polyhydric alcohols with diisocyanates or by the polymerization of diisocyanates. It is also possible, furthermore, to employ polyisocyanates which are preparable by reacting hexamethylene diisocyanate with small amounts of water. These products contain biurete groups.

These compounds are widely known in the art and are for the most part available commercially. Commercial examples include ®Desmodur H, ®Desmodur T, ®Desmodur N 100, ®Desmodur N 3300, ®Desmodur CD (BAYER), ®Basonat PLR 8401, ®Basonat PLR 8638 (BASF), ®Tolonate HDB 75 MX, ®Tolonate HDT 90 (Rhône Poulenc) ®Vestanat IPDI, ®Vestanat T 1890/100, ®Vestanat H12-MDI, ®Vestanat TMDI, and ®Vestanat T 2960 (Hüls).

Dispersions having particularly advantageous properties, as described at the outset, are obtained when using polyisocyanates with an aliphatic and/or cycloaliphatic structure which do not possess any aromatic constituents. Mention may be made of isophorone diisocyanate, 2,4'-methylenedicyclohexyl diisocyanate, 4,4'-methylenedicyclohexyl diisocyanate, 2,2,4- and 2,4,4-trimethylenehexamethylene diisocyanate, with isophorone diisocyanate being the most preferred.

Also suitable as polyisocyanates in the context of the present invention are the analogists isothiocyanates. However, since these compounds are less readily available commercially, they are less preferred.

All of the stated isocyanates can be used both individually and as a mixture.

As stated in claim 1, the isocyanate is reacted with at least one polyol. A polyol for the purposes of the present invention is a compound having at least two hydroxyl functionalities. The polyol may possess a unitary molecular weight or a random distribution of the molecular weight.

The polyol is preferably a high molecular weight polyol having a random molar mass distribution. A "high molecular weight polyol" in this sense is, for the purposes of the present invention, a polyol having two or more hydroxyl groups, the weight-average molecular weight of the high molecular weight polyol being situated in the range from >500 to about 20 000 g/mol. It is preferably situated in the range from >500 to 15 000 g/mol, expediently in the range from >500 to 10 000 g/mol, and very preferably in the range from >500 to 5000 g/mol, as measured by gel permeation chromatography.

Examples of high molecular weight polyols are the polyether polyols. Examples of polyether polyols are polyalkylene ether polyols of the structural formula in which the substituent R is hydrogen or a lower alkyl group having 1-5 carbon atoms, including mixed substituents, and n is typically 2-6 and m is 2 to 100 or else higher. Encompassed are the poly(oxytetramethylene) glycols (=polytetramethylene ether glycol=polytetrahydrofuran), poly(oxyethylene) glycols, poly(oxy-1,2-propylene) glycols, and the reaction products of ethylene glycol with a mixture of 1,2-propylene oxide, ethylene oxide, and alkyl glycidyl ethers.

One particularly preferred polyol is polytetrahydrofuran. It is available, for example, from BASF under the trade name ®PTHF 650 or ®PTHF 2000.

It is also possible to use polyether polyols which are obtained from the oxyalkylation of various polyols, such as from glycols, such as ethylene glycol, 1,6-hexanediol, bisphenol A, etc.

Polyether polyols which have at least three hydroxyl functionalities may likewise be used.

In order to obtain at least three hydroxyl functionalities which can react with isocyanate groups, it is possible to make use, for example, of alcohols as starter molecules, these alcohols containing at least three hydroxyl groups. Such alcohols include, among others, glycerol, trimethylolpropane, erythritol, pentaerythritol, sorbitol, and inositol, among which glycerol is preferred.

The abovementioned alcohols having at least three hydroxyl groups can be reacted, for example, by polyaddition of cyclic ethers, such as oxiranes, for example, and also tetrahydrofuran. The oxiranes which can be used for the polyaddition include, among others, the abovementioned oxiranes. Among these, ethylene oxide and propylene oxide are preferred.

The polyaddition of cyclic ethers to polyhydric alcohols is widely known within the art. Useful indications are found by the skilled worker in, for example, Ullmann's Encyclopedia of Industrial Chemistry, 5th ed., in the "polyoxyalkylenes" entry.

A preferred trifunctional polyol is a trifunctional polypropylene ether polyol formed from propylene oxide, ethylene oxide, and glycerol. One such polyol is sold under the name ®Baycoll BT 5035 by Bayer.

It is also possible, furthermore, for polyoxyalkylenes which have three or more hydroxy-functionalities to be prepared in situ, by linking polyoxyalkylenes having two hydroxyl functionalities by means of polyisocyanates having three or more isocyanate groups.

Likewise possible for use as high molecular weight polyols are medium molecular weight copolyester diols, linear copolyesters having terminal primary hydroxyl groups. Their weight-average molecular weight is preferably 3000-5000 g/mol. They are obtainable by esterifying an organic polycarboxylic acid or a derivative thereof with organic polyols and/ or with an epoxide. Generally speaking, the polycarboxylic acids and polyols are aliphatic or aromatic dibasic acids and diols.

The diols used in the copolyesterdiol are preferably alkylene glycols, such as ethylene glycol, neopentyl glycol, or else glycols such as bisphenol A, cyclohexanediol, cyclohexanedimethanol, diols derived from caprolacton, an example being the reaction product of epsilon caprolacton and ethylene glycol, hydroxy-alkylated bisphenols, polyether glycols, such as poly(oxytetramethylene)glycol, and the like. Polyols of higher functionality can likewise be used. They include, for example, trimethylolpropane, trimethylolethane, pentaerythritol, and also higher molecular weight polyols, such as those prepared by oxyalkylation of low molecular weight polyols.

As the acid component in the copolyesterdiol it is preferred to use monomeric carboxylic acids or carboxylic anhydrides having 2 to 36 carbon atoms per molecule. Examples of acids which can be used are phthalic acid, isophthalic acid, terephthalic acid, tetrahydrophthalic acid, decanedioic acid, and dodecanedioic acid. The polyesters may contain small amounts of monobasic acids, such as benzoic acid, stearic acid, acetic acid, and oleic acid. Higher polycarboxylic acids can also be used, such as trimellitic acid.

Medium-length copolyesterdiols preferred in accordance with the invention are sold by Degussa under the brand name DYNACOLL® 7380 and DYNACOLL® 7390.

Another class of high molecular weight polyols which can be used in accordance with the invention are the polyesters of the lactone type. These polyesters are formed by the reaction between a lactone, such as epsilon-caprolactone, and a polyol. The product of a lactone with an acid-containing polyol can also be used.

It is likewise possible to use a high molecular weight polyol derived from poly(meth)acrylates. An example of one such compound is poly-n-butyl methacrylate-diol, which is obtainable under the name ®BD 1000 from Goldschmidt.

Dispersions having particularly advantageous properties, more particularly having an outstanding impact strength, are obtained when the polyol used is a polybutadienediol having hydroxyl end groups. The weight-average molecular weights of preferred polybutadienediols of this kind are situated preferably in the range from 2000 to 5000 g/mol.

Such polybutadienediols are obtainable under the trade names ®KRASOL LBH 2000, ®KRASOL LBH 3000 and ®KRASOL LBH 5000, sold by Sartomer (formerly Kauchuk, CZ).

In principle it is possible to use one or more high molecular weight polyols of which examples are given above. In the present invention the high molecular weight polyol is preferably a diol.

In one particularly preferred embodiment a low molecular weight polyol as well as a high molecular weight polyol is added to the reaction mixture in order to form the polyurethane(meth)acrylate particles. In one highly preferred embodiment, accordingly, polyurethane(meth)acrylate particles are obtainable by reacting a polyisocyanate with a high molecular weight polyol, a low molecular weight polyol, and a hydroxyalkyl(meth)acrylic ester in the reactive diluent.

A "low molecular weight polyol" in accordance with the invention is a compound which possesses two or more hydroxyl functionalities and a molar mass of 50-500 g/mol and preferably 50-250 g/mol. The molecular weight may be unitary, or it may—in the case of a polymerization product— be randomly distributed, in which latter case the molecular weight refers to the weight-average molecular weight.

A preferred low molecular weight polyol is one with a unitary molecular weight, particular preference being given to the aliphatic diols with 2 to 18 carbon atoms, such as ethylene glycol, 1,2-propanediol, 1,3-propanediol, 1,2-butanediol, 1,4-butanediol, 1,2-hexanediol, and 1,6-hexanediol, and the cycloaliphatic polyols, such as 1,2-cyclohexanediol and cyclohexanedimethanol. Likewise suitable for use are the polyols with ether groups, such as diethylene glycol and triethylene glycol and dipropylene glycol. Examples of low molecular weight polyols having more than two hydroxyl groups are trimethylolmethane, trimethylolethane, trimethylolpropane, glycerol, and pentaerythritol. With maximum preference, 1,4-butanediol and 1,3-propanediol are used as low molecular weight polyol.

It is also possible to use low molecular weight polyols having a random distribution of the molecular weight. As a low molecular weight polyol with a random molecular weight distribution it is possible in principle to use any polyol which has been synthesized from the same monomeric units as the above-described high molecular weight polyols but possesses a correspondingly lower molecular weight, as indicated above. To a person skilled in the art it is obvious that the weight-average molecular weight in the case of a low molecular weight polyol with a random molar mass distribution will be situated predominantly in the vicinity of the upper limit of the above-defined range of 50-500 g/mol.

Particularly preferred nucleophilically functionalized (meth)acrylic esters are hydroxy-functional (meth)acrylic esters. A "hydroxy-functional (meth)acrylic ester" in accordance with the invention is a (meth)acrylic ester which in the radical originating from the alcohol still carries at least one hydroxyl functionality after the esterification with the (meth) acrylic acid. In other words, the ester in question is the ester of a (meth)acrylic acid and a diol or polyol, preference being given to the diols.

One particularly preferred group of the "hydroxy-functional (meth)acrylic esters" are the hydroxyalkyl(meth) acrylic esters. Hydroxyalkyl(meth)acrylic esters which can be used in accordance with the invention are esters of (meth) acrylic acid with dihydric aliphatic alcohols. These compounds are widely known in the art. They can be obtained, for example, by the reaction of (meth)acrylic acid with oxiranes.

The oxirane compounds include, among others, ethylene oxide, propylene oxide, 1,2-butylene oxide and/or 2,3-butylene oxide, cyclohexene oxide, styrene oxide, epichlorohydrin, and glycidyl esters. These compounds can be used both individually and as a mixture. The reaction to give the hydroxyalkyl(meth)acrylic esters is described in, for example, DE-A-24 39 352, DE-15 68 838, and GB 1 308 250.

The hydroxyalkyl(meth)acrylic esters thus obtainable are frequently obtainable commercially and therefore particularly suitable for the purposes of the invention.

The hydroxyalkyl(meth)acrylic esters may also contain substituents, such as phenyl radicals or amino groups, for example.

Preferred hydroxyalkyl(meth)acrylic esters include 1-hydroxyethyl acrylate, 1-hydroxyethyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate and 6-hydroxyhexyl methacrylate, 3-phenoxy-2-hydroxypropyl methacrylate, 4-hydroxybutyl acrylate, N-hydroxymethylmethacrylamide, caprolactonehydroxyethyl methacrylate, and caprolactonehydroxyethyl acrylate. Especial preference among these is given to the hydroxyethyl methacrylates, the hydroxyethyl acrylates, 2-hydroxypropyl methacrylate, and 2-hydroxypropyl acrylate. The most preferred is 2-hydroxyethyl methacrylate.

A further preferred group of hydroxy-functional (meth) acrylic esters are the polyether methacrylates. By these are meant substances which are obtained by esterifying a (meth) acrylic acid with a polyether polyol, preferably a polyetherdiol. Polyether polyols of this kind have already been listed earlier on above in connection with the identification of preferred polyols. In the case of the polyether methacrylates, the hydroxyalkyl radical of the ester contains polyoxyalkylene groups, which may be both linear and branched, such as polyethylene oxide, polypropylene oxide, and polytetramethylene oxide, for example. These groups frequently have between 2 and 10 oxyalkylene units. Specific examples are polyethoxy methacrylate, polypropoxy methacrylate, polyethylene oxide/polytetramethylene oxide methacrylate, and polyethylene oxide/polypropylene oxide methacrylate.

In principle, any of the polyols stated earlier on above (both high molecular weight and low molecular weight polyols) can be used to form a hydroxy-functional (meth)acrylic ester of the invention, the diols being very particularly preferred.

In a further advantageous embodiment an amino-functional (meth)acrylic ester as capping agent can be employed as nucleophilically functionalized (meth)acrylic ester. An "amino-functional (meth)acrylic ester" in accordance with the invention is a (meth)acrylic ester which in the radical originating from the alcohol still carries at least one amino functionality after the esterification with the (meth)acrylic acid. Preferred hydroxyalkyl(meth)acrylic esters include 1-aminoethyl acrylate, 1-aminoethyl methacrylate, 2-aminoethyl acrylate, 2-aminoethyl methacrylate, 2-aminopropyl acrylate, 2-aminopropyl methacrylate, 3-aminopropyl acrylate, 3-aminopropyl methacrylate, 6-aminohexyl acrylate and 6-aminohexyl methacrylate, 3-phenoxy-2-aminopropyl methacrylate, and 4-aminobutyl acrylate. Of these, 1-aminoethyl methacrylate, 2-aminoethyl methacrylate, 1-aminoethyl acrylate, 2-aminoethyl acrylate, 2-aminopropyl methacrylate, and 2-aminopropyl acrylate are very particularly preferred. The most preferred is 2-aminoethyl methacrylate. Consideration may also be given to amino-functional (meth) acrylic esters which carry a hydrocarbon radical on the nitrogen, such as methyl, ethyl, propyl, isopropyl, for example. Examples are 2-(N-methyl)aminoethyl methacrylate, 2-(N-methyl)-aminoethyl acrylate, 2-(N-methyl)aminopropyl methacrylate, and 2-(N-methyl)aminopropyl acrylate.

In yet another advantageous embodiment a mercapto-functional (meth)acrylic ester as capping agent can be used as nucleophilically functionalized (meth)acrylic ester. A "mercapto-functional (meth)acrylic ester" in accordance with the invention is a (meth)acrylic ester which in the radical originating from the alcohol still carries at least one mercapto functionality after the esterification with the (meth)acrylic acid. Preferred mercaptoalkyl(meth)acrylic esters include 1-mercaptoethyl acrylate, 1-mercaptoethyl methacrylate, 2-mercaptoethyl acrylate, 2-mercaptoethyl methacrylate, 2-mercaptopropyl acrylate, 2-mercaptopropyl methacrylate, 3-mercaptopropyl acrylate, 3-mercaptopropyl methacrylate, 6-mercaptohexyl acrylate, and 6-mercaptohexyl methacrylate, 3-phenoxy-2-mercaptopropyl methacrylate, and 4-mercaptobutyl acrylate. Among these, the mercaptoethyl methacrylates, the mercaptoethyl acrylates, 2-mercaptopropyl methacrylate, and 2-mercaptopropyl acrylate are very particularly preferred. The most preferred is 2-mercaptoethyl methacrylate.

The amount of the nucleophilically functionalized (meth) acrylic ester is chosen such that free isocyanate groups still present after the polycondensation between polyisocyanate and polyol are fully reacted. In order to determine the optimum amount of nucleophilically functionalized (meth) acrylic ester it is possible to determine the free isocyanate group content after the polycondensation. Determining the free isocyanate group content can be done using methods known to the skilled worker. These include, among others, infrared spectroscopy methods or titrations.

As mentioned at the outset, the addition of a stabilizer to the dispersion of the invention is not automatically necessary. If, nevertheless, it should be considered necessary, it is possible to add a stabilizer. In principle all stabilizers which are familiar to the skilled worker for the stabilization of polyurethane dispersions can be added, more particularly dimethylolpropionic acid, and phase mediators based on ethylene glycol and 2-amino-2-methylpropanol.

The dispersion of the invention is not prepared using any diamines or higher functional amines. This restriction does not include catalysts and the abovementioned amino-functional (meth)acrylic esters as capping agents, if such are used.

The polyurethane(meth)acrylate from which the particles of the dispersion of the invention are composed generally possesses a weight-average molecular weight of 3000 g/mol to 600 000 g/mol, but preferably from 3000 g/mol to 500 000 g/mol.

In the dispersion of the invention the polyurethane(meth)acrylate particles have an average diameter of less than 40 nm, so giving the desired transparency. Preference is given to an average particle diameter of less than 20 nm, more preferably of less than 10 nm, more preferably still of less than 7 nm. Particularly advantageous particle diameters obtained in accordance with the invention are 2-7 nm, more advantageously 2-6 nm, more advantageously still 3-6 nm, and most advantageously 3-5 nm.

The diameters stated can be determined by means of light scattering. For details, refer to the attached examples.

In the context of the present invention, the solids content is the weight of the polyurethane(meth)acrylate particles relative to the weight of the dispersion as a whole. Within the dispersion of the invention the solids content is preferably at least 40% by weight, more preferably at least 50% by weight. Particular preference is given to a solids content of 50-80% by weight, and most preferably 50-70% by weight.

The viscosity of the dispersions of the invention is in general between 0.1 and 5.0 Pa·s, measured rheologically with a cone/plate geometry at a shear rate of 100 s$^{-1}$ and T=25-26° C. For details regarding the method, refer to the attached examples. The viscosity is situated preferably between 0.1 and 2.0 Pa·s.

A critical advantage of the present invention is the transparency of the dispersion. A measure of the transparency in the context of the present invention is the absorbance, which is defined as the negative decadic logarithm of the transmittance:

$$E = lg\frac{I}{I_0}$$

$\frac{I}{I_0}$ = transmittance, $I$ = transmitted radiation, $I_0$ = incident radiation In accordance with the invention the absorbance in the wavelength range from 400 to 800 nm for a dispersion with 6%-9% by weight of particles is less than 0.4.

In preferred embodiments the absorbance is less than 0.2, in the case of even more preferred embodiments less than 0.1. In the most advantageous embodiments the absorbance is less than 0.05 and in favorable cases even less than 0.03, relative to a wavelength between 400 and 800 nm and a particle content of 6%-9% by weight.

In the cured dispersion, outstanding transmissions and low absorbance values are likewise achieved. The absorbance values of the cured dispersion with a 6%-9% by weight particle content in the wavelength range of 400-800 nm are between 0.03 and 0.7, for a measured path length of 180-300 μm. Particular preference is given to the range up to a maximum of 0.2.

Further distinguishing features of the dispersions of the invention include a very high stability. Stability in the context of the present invention means that the dispersion can be stored at room temperature without visible alteration for at least two months, with neither agglomeration nor precipitation of the dispersed particles being observable.

In a further aspect, the invention relates to a preparation process for the dispersion described at the outset.

In this process, a polyisocyanate is reacted with at least one polyol and a nucleophilically functionalized (meth)acrylic ester in a reactive diluent in a stirred tank. These reactants have been described at length above. The process is characterized in that the reaction is carried out at a stirrer speed of at least 5 m/s, the ratio of stirrer diameter to vessel diameter being 0.3-0.80, and the distance of the stirrer from the base of the vessel being 0.25 to 0.5 times the stirrer diameter.

As already mentioned above, in one particularly preferred embodiment, a high molecular weight polyol and a low molecular weight polyol are used in preparing the dispersion. For the reaction of the constituents stated there are a wide variety of conceivable process variants that are possible. Thus in one preferred embodiment of the process, for example, a high molecular weight polyol can be introduced and then a low molecular weight polyol, the polyisocyanate, and the reactive diluent can be added. It is also possible, however, in accordance with another preferred embodiment, to introduce the polyisocyanate and then to add the high molecular weight and low molecular weight polyols and the reactive diluent. Some of the reactive diluent may optionally be introduced at the start.

The nucleophilically functionalized (meth)acrylic ester is in any case added last, in order to react with free isocyanate groups that remain after the polyurethane particles have formed, and to form polyurethane(meth)acrylate particles.

Although it is obvious to a skilled worker, it should be pointed out that the reactants employed, and more particularly the polyol, should be anhydrous.

In order to accelerate the reaction it is possible with advantage to use catalysts, such as, for example, tertiary amines, which include, among others, 1,4-diazabicyclo[2.2.2]octane, N-methylmorpholine, N,N-diethylcyclohexylamine, and N,N,N',N'-tetramethyldiaminomethane, or organotin compounds, which include, among others, dibutyltin dilaurate and tin dioctoate. These catalysts, and the amounts in which these compounds are employed, are widely known in the art and are described in, for example, Ullmann's Encyclopedia of Industrial Chemistry, 5th ed., in the "polyurethanes" entry.

In the reaction it is possible to add inhibitors which prevent free-radical polymerization of the (meth)acrylates during the reaction. These inhibitors are widely known in the art. Inhibitors useful in accordance with the invention are, more particularly, inhibitors from the class of the dihydroxybenzenes, the benzoquinones, the hindered phenols, and hindered phenols based on triazine derivatives. Based on the weight of the reaction mixture as a whole, the fraction of the inhibitors, individually or as a mixture, is generally 0.01%-0.5% (weight/weight).

An important parameter for the preparation of the dispersion of the invention is the stirring speed, expressed as the peripheral speed of the stirrer. The peripheral speed can be calculated in accordance with the following equation from the rotational speed and maximum diameter of the stirrer:

$$v = \frac{\pi \cdot D \cdot n}{60}[m/s]$$

n revolutions (min$^{-1}$)
D diameter (m)
v peripheral speed (m/s)

In one preferred embodiment of the process the peripheral speed is at least 12 m/s and more preferably still is at least 14 m/s.

In the course of the reaction the reactants are dispersed in the reactive diluent in order to give the particle sizes stated in accordance with the invention. For this purpose it is necessary to harmonize not only the geometry of the working vessel but also the diameter, the peripheral speed, and the distance of the stirrer from the base. In accordance with the invention, as mentioned above, the ratio of maximum stirrer diameter to vessel diameter is 0.3-0.80 and the distance of the stirrer from the base of the vessel is 0.25 to 0.5 times the stirrer diameter.

A stirrer used in order to achieve optimum results is a high-speed radially or axially conveying stirrer. With particular preference the stirrer used is a disk stirrer or a dispersing disk. Maximum preference is given to the use of a dispersing disk (toothed disk). One dispersing apparatus useful in accordance with the invention is available from VMA-Getzmann under the name DISPERMAT® F1.

The product description for the DISPERMAT® F1 dispersing apparatus yields the information given below as to how laboratory experiments can be transposed to plant production:

The outcome of dispersing depends on the one hand on the transport of the agglomerates into the vicinity of the toothed disk, but on the other hand also on the mechanical input of stirring work into the dispersing vessel. The mechanical input of work is the parameter which defines the maximum achievable end state of deagglomeration, while the transport of the agglomerates defines the period of time necessary in order to achieve the ultimate state of dispersion. The agglomerates are dispersed principally within the shearing field which develops at the end faces of the dispersing disk. The maximum shearing field is determined by the outermost edge of the toothed disk, since it is this part that moves at the highest speed through the dispersion. This speed (the peripheral speed) can therefore be employed as a criterion for the transposition of laboratory results to plant practice.

This statement relates to the end state which is achievable, but not to the time required to achieve it. Under otherwise identical conditions, the end state of dispersion is reached sooner on the laboratory scale, since in this case the path of the agglomerates to the toothed disk is shorter than in the case of the dissolver in production. The exact correlation in terms of the end state that is achievable is also achieved only when the temperature of the material to be dispersed in the laboratory is comparable with the temperature during dispersion on the production scale.

As a result of the information above, a skilled person is capable of transposing the preparation of the dispersion of the invention from the laboratory to the plant scale, and vice versa.

For the preparation of the dispersion, the chosen molar ratio of the isocyanate groups to the hydroxyl groups from the polyol or polyols is 1.01 to 1.8 and preferably 1.03 to 1.7.

The molar ratio of the OH groups of the low molecular weight polyol to the OH groups of the high molecular weight polyol is 0 to 1.4 (where the value 0 describes the embodiment in which no low molecular weight polyol at all is used), and preferably 0.3 to 1.2.

The reaction of the isocyanate groups with the hydroxyl groups is widely known in the art. Thus the reaction temperature may vary across a wide range; frequently, however, the temperature is situated in the range from 30° C. to 120° C., preferably in the range from 60° C. to 90° C. Similar comments apply to the pressure at which the reaction is performed. Thus, the reaction can take place not only under subatmospheric pressure but also under superatmospheric pressure. Preferably, however, it is carried out at atmospheric pressure. The reaction can take place under air or under an inert gas atmosphere, there preferably being a small oxygen fraction present, since this inhibits possible polymerization.

The curing of the dispersion takes place by free-radical polymerization of the reactive diluent as a result of the addition of a polymerization initiator. In principle, it is possible in this context to employ all of the methods known to the skilled worker for the curing of adhesives by polymerization. Hence there is also no specific restriction on the initiator for curing. Examples of initiators which can be used are the peroxides and hydroperoxides, such as dibenzoyl peroxide, diacetyl peroxide, and tert-butyl peroxide. A further class of initiators are the heat-activatable initiators, more particularly the azo initiators, such as azobisisobutyronitrile.

The decomposition of peroxide can be induced by means of promoters at low temperatures. One particularly preferred promoter, for example, is N,N-bis-2-hydroxyethyl)-p-toluidine (DEPT).

The cured dispersion possesses a very high impact strength and tensile shear strength. The tensile shear strength, in the context of the present invention also referred to as adhesive strength τ, is determined in accordance with standard DIN EN 1465 and reported in MPa.

The tensile shear strength values of the cured dispersion are in the range from 1 to 12 MPa, depending on the dispersion and backing that are used.

As a result of this described adhesive strength, the dispersion of the invention is particularly suitable as an adhesive. A further aspect of the present invention, accordingly, concerns the use of the dispersion as a dispersion-based adhesive. For the formulation of an adhesive it is possible to use the dispersion in pure form, i.e., as described above. It can, however, also be admixed with further reactive adhesives, more particularly with (meth)acrylate-based reactive adhesive systems.

Particularly suitable (meth)acrylate adhesive systems include the following:

A-B types: component A consists of the acrylate resin with the accelerant, and component B of the resin with the curing additive. Both components are storable without any pot life limitation. The reaction does not take place until accelerant, curative and resin are mixed together. It is therefore at this moment that the pot life of the mixture must be taken into account again. Another possibility is to apply component A to one of the adherends, and component B to the second adherend. After the adherends have been fixed, the two components then mix, and the adhesive film cures.

Direct addition of curative: the curative is mixed in small amounts of about 1% to 3%, in the form of a powder, into the resin. Owing to the small amount of curative, very thorough mixing is particularly important in this case. With this approach, owing to the limited pot life (in the range of minutes, or exceptionally up to 1 hour), bonding must be carried out immediately. This method cannot be employed with monomers having a high reaction rate; in such cases, processing takes place by the curative varnish method.

Curative varnish method, or else "no-mix" method: in this version, the curative, in solution in an organic solvent, is applied to one of the two adherends. After the solvent has evaporated, the curative remains in a very thin film on the surface, and is able to remain there for a long enough time without undergoing alteration. The resin component with accelerant is applied to the other adherend, again without pot life limitation. Only when the two adherends are fixed to one another does the chemical reaction of adhesive-film formation take place, as a result of the contact of curative with resin/accelerant system.

A further aspect of the invention concerns the use of the dispersion described for producing transparent cast glass. In this case the dispersion can again be used in pure form or else in a mixture with other cast glass mixtures, more particularly (meth)acrylates. Cast glass mixtures and methods of producing cast glasses are known to the skilled worker and will not be described in detail here. For the formation of cast glasses, the dispersion can be cured in the way already described above.

In yet another aspect, the present invention also concerns a molding which is obtainable from the above-described dispersion of the invention by curing of the dispersion. The molding may preferably be a cast glass, although there is no particular restriction on the form of the molding.

As mentioned above, the dispersion of the invention in the cured state possesses not only an outstanding bond strength (tensile shear strength) and a high transparency but also very good impact strength properties. A further aspect of the present invention, therefore, concerns the use of the dispersions of the invention as an impact modifier in molding compounds, adhesives, and cast glasses, more particularly in (meth)acrylate-based systems.

EXAMPLES

The invention is illustrated below by examples, which should not be understood as any restriction on the inventive concept.

1. Chemicals

| Isocyanates | | | | |
|---|---|---|---|---|
| Vestanat IPDI (Degussa) | IPDI isophorone diisocyanate | |  | >99.5%, Mw (222.29), $d_{20}$ (1.058-1.064), fl.p. (155), 37.5%-37.8% NCO |
| Vestanat TMDI (Degussa) | 2,2,4-/2,4,4-trimethyl-hexa-methylene diisocyanate (1:1) | |  | Mw(210.28) ≧99.5%, $d_{20}$ (1.010-1.016) fl.p. (148° C.), 39.7-40% NCO |

| Polyols | | | | |
|---|---|---|---|---|
| PTHF 2000 (BASF) | Polytetrahy-drofuran = polytetra-methylene ether glycol |  | | Mw (~650) |
| Krasol LBH 2000 (Kaucuk) | Poly-butadienediol with OH end groups |  | | Mw (2160), ≧99.5%, $d_{25}$ (0.900), fl.p. (>225° C.) |
| Krasol LBH 2000 (Kaucuk) | Polybuta-dienediol with OH end groups |  | | Mw (about 3000) |
| Krasol LBH 5000 (Kaucuk) | Polybuta-dienediol with OH end groups |  | | Mw (4638), ≧99.5%, $d_{25}$ (0.900) fl.p. (>225° C.), nOH (23.62 gKOH/kg) |
| Baycoll BT 5035 (Bayer) | Polypropylene oxide/ethylene oxide glycerol trifunctional polypropylene ether polyol | | | Mw (-4800), m.p. (290), $d_{20}$ (1.04), fl.p. (195° C.), nOH (35.0+/−2.0 mgKOH/g) |
| BD 1000 (Goldschmidt) | PBMA poly-n-butylmethacryl ate diol based on n-butyl methacrylate monomer |  | | Mw (1000), Tg (−30° C.) |
| 1,4-BDO (Applichem) | 1,4-butanediol |  | | Mw (90.12), >99%, $d_{20}$ (1.02), m.p (−20° C.), d.p. (230° C.) |

| Catalysts | | | |
|---|---|---|---|
| DBTL (Merck) | Dibutyltin dilaurate for synthesis = dibutyltin didodecanatate (catalysts) | CH₃(CH₂)₁₀—C(=O)—O—Sn((CH₂)₃CH₃)₂—O—C(=O)—(CH₂)₁₀CH₃ | >97%, Mw (631.55), $d_{20}$ (1.05) |

| Methacrylates | | | |
|---|---|---|---|
| HEMA (Degussa-Röhm Methacrylate) | 2-HEMA 98 2-hydroxyethyl methacrylate | CH₂=C(CH₃)C(=O)OCH₂CH₂OH | ≧98%, Mw (130.14), $d_{20}$ (1.07), fl.p. (101° C.), b.p. (+250° C.) |
| POEMA (Degussa-Röhm GmbH) | 2-phenoxyethyl methacrylate with 1.5% 2-phenoxy-ethanol | CH₂=C(CH₃)C(=O)OCH₂CH₂OC₆H₅ | >95.0%, Mw (206.24), $d_{20}$ (1.080), fl.p. (>100° C.), b.p. (80-85° C. at 0.1 hPa) |

| Stabilizers | | | |
|---|---|---|---|
| Bis-MPA Perstrop | DMPA Dimethylolpropionic acid for controlling the particle size | HOCH₂—C(CH₃)(COOH)—CH₂OH | >97%, mw (134.13), $d_{20}$ (0.840), m.p. (180-190° C.), fl.p. (>150° C.), nOH (835 gKOH/kg), nH (415 gKOH/kg) |
| AMP (90 ®/95 ®) (Angus chemie GmbH) | 2-amino-2-methyl-1-propanol Codispersant for particle systems | HOCH₂—C(CH₃)₂—NH₂ | 100%, mw (89.14), $d_{40}$ (0.928), b.p. (165° C.), m.p. (49-53° C.), fl.p. (81° C.) |

| Curatives and accelerants | | | |
|---|---|---|---|
| DPBO | Dibenzoyl peroxide (curative) | Ph—C(=O)—O—O—C(=O)—Ph | >97%, mw (242.23), m.p. (104-106° C.) |
| DEPT | N,N-bis(2-hydroxyethyl)-p-toluidine (accelerant) | CH₃—C₆H₄—N(CH₂CH₂OH)₂ | >97%, mw (195.26), m.p. (49-53° C.), fl.p. (>150° C.) |

2. Formulas and Procedures

Apparatus dispersion apparatus: Dispermat F1 from VMA-Getzmann GmbH with d=22 mm dissolver disk
250 ml glass reactor with lid, ring seal, steel closure dropping funnel 250 ml, thermostatable
thermostat
100 ml dropping funnel
oil bath with hotplate
thermometer with temperature sensor and connection to hotplate
vacuum pump of drying cabinet Example 1 (t37)

Krasol 5000, 11000 rpm

Chemicals:
Vestanat IPDI, isophorone diisocyanate, Degussa.
POEMA, phenoxyethyl methacrylate, Degussa.
Krasol LBH 5000, Kaucuk. M=4638 g/mol, OH groups: 0.421 mmol/g
n-butanediol, BASF.
DBTDL, dibutyltin laurate, Merck.
2-HEMA, 2-hydroxyethyl methacrylate 97%, Degussa.
Part I: Isocyanate Mixture
  4.2504 g of Vestanat IPDI and 18.99 g of POEMA.
Part II: Diol Mixture
  Heat 24.9723 g of Krasol LBH 5000, 0.5348 g of n-butanediol and 11.2080 g of POEMA to 50° C.
Part III: Catalyst
  0.0324 g of DBTDL
Part IV: HEMA
  2.03 g of 2-HEMA Procedure:

Part II was added dropwise via a thermostatic dropping funnel to part I in the 250 ml glass reactor and the components were mixed with the Dispermat at 11 000 rpm at RT for 1 h. The 250 ml glass reactor was heated to 60° C. and the heat was held for 30 minutes. Thereafter part III was added dropwise and dispersed for 30 minutes. Subsequently 2-HEMA was added and the mixture was cooled to RT. Finally vacuum was applied (max.) and degassing took place for up to 1 h.

The dispersion remained stable at room temperature over two months.

Example 2 (t37)

Krasol 3000, 11 000 rpm

The example was as for example 1, with the exception of the following changes:

Krasol LBH 3000, M=2650 g/mol, OH groups: 0.737 mmol/g.

Part II: Diol Mixture:

14.2650 g of Krasol LBH 3000, 0.5348 g of n-butanediol and 11.2080 g of POEMA were heated to 50° C.

The dispersion remained stable at room temperature over two months.

Example 3 (t37)

Krasol 2000, 5000 rpm

The example was as for example 1, with the exception of the following changes:

Krasol LBH 3000, M=2160 g/mol, OH groups: 0.887 mmol/g.

Dispermat at 5000 rpm

Part II: Diol Mixture:

11.8527 g of Krasol LBH 2000, 0.5348 g of n-butanediol and 11.2080 g of POEMA were heated to 50° C.

The dispersion remained stable at room temperature over two months.

Example 4 (t37)

Krasol 2000, 11 000 rpm

The formula was as for example 1, with the exception of the following change:

Krasol LBH 2000, M=2160 g/mol, OH groups: 0.887 mmol/g.

The procedure was as in example 3, with the following amendment:

Dispermat at 11 000 rpm

The dispersion remained stable at room temperature over two months.

Example 5 (t34)

Chemicals

Dibutyltin laurate
Phenoxyethyl methacrylate
Vestanat IPDI
2-Hydroxyethyl methacrylate
Polytetrahydrofuran 2000
Argon Part I: 27.8466 g of PTHF 200 and 16.20 g of POEMA were stirred at T=60° C., 10 000 rpm over a time of t=120 min.

Part II: 5.4947 g of Vestanat IPDI and 16.00 g of POEMA were added via a dropping funnel (under argon) at T=50° C.

Part III: 0.0367 g of DBTDL was added and the mixture was stirred over a time of t=60 min.

Part IV: 2.80 g of 2-HEMA were added and the mixture was stirred until homogeneous.

The dispersion remained stable at room temperature over two months.

Example 6 (t33)

Chemicals

Toluene
1M Hydrochloric acid
Bromocresol green
Isopropanol
2-Hydroxyethylene methacrylate 97%
Dibutyltin laurate
POEMA
1,4-Butanediol
Vestanat TMDI
Krasol LBH 2000
Diethylamine Part I: 28.399 g of Krasol 2000 and 0.611 g of n-butanediol were stirred at T=110° C., 10 000 rpm over a time of t=30 min.

Part II: subsequently 10.82 g of POEMA were added. The mixture was cooled to T=60° C. This was followed by the addition of 0.0096 g of DBTDL.

Part III: then 4.22 g of Vestanat TMDI and 20.65 g of POEMA were added via a dropping funnel over a period of t=30 min.

Part IV: the mixture was stirred for a further t=30 min. Finally, 0.054 g of 2-HEMA was added with stirring over t=90 min.

The dispersion remained stable at room temperature over two months.

Example 7 (t32)

Part I: 20.77 g of POEMA and 2.02 g of Vestanat IPDI were stirred at T=60° C. over a period of t=60 min.

Part II: then 0.0268 g of DBTDL was added.

Part III: subsequently 27.13 g of Baycoll 5035 and 10.12 g of POEMA were added via a dropping funnel at T=50° C., 11 000 rpm, over a period of t=30 min.

Part IV: finally 0.072 g of 2-HEMA was added over a period of t=30 min.

The dispersion remained stable at room temperature over two months.

Example 8 (t27)

Part I: 27.1311 g of Krasol LBH 5000, 0.526 g of BD-1000, 0.07560 g of bis-MPA, 0.0584 g of AMP-90 and 15.54 g of POEMA were mixed at T=80° C. for one hour.

Part II: after 20 minutes, 1.72 g of Vestanat IPDI and 15.22 g of POEMA were added dropwise with stirring at 12 000 rpm.

Part III: thereafter 0.0184 g of DBTDL was added.

Part IV: finally 0.054 g of HEMA was added.

The dispersion remained stable at room temperature over two months.

3. Transparency/Transmittance a) Liquid Samples

The transmittance was determined by recording spectra in the spectral range of 300-1100 nm in THF. The undiluted samples were completely transparent, but were not amenable to direct measurement, owing to the sensitivity of the measuring system. The quantities indicated in table 1 were in each case made up with 2000 μl of THF and subjected to measurement using an Agilent 8453 UV/VIS spectrometer.

TABLE 1

| Sample | Quantity of sample [g] | THF volume [μl] |
|---|---|---|
| Comparative-POEMA | 0.0309 | 2000 |
| Example 8 | 0.0239 | 2000 |
| Example 7 | 0.0234 | 2000 |
| Example 6 | 0.0233 | 2000 |
| Example 5 | 0.0296 | 2000 |
| Example 3 | 0.0299 | 2000 |
| Example 2 | 0.0343 | 2000 |
| Example 1 | 0.0250 | 2000 |
| Example 4 | 0.0294 | 2000 |

The spectra are shown in the attached FIG. 1. For clarity the absorbance values at 400, 600 and 800 nm are set out in table 2.

TABLE 2

Absorbance values as a function of wavelength

| | Wavelength [nm] | | | | |
|---|---|---|---|---|---|
| Sample | 400 | 500 | 600 | 700 | 800 |
| Comparative - POEMA | 0.10 | 0.08 | 0.07 | 0.05 | 0.05 |
| Example 8 | 0.37 | 0.36 | 0.31 | 0.28 | 0.24 |
| Example 7 | 0.22 | 0.22 | 0.20 | 0.19 | 0.18 |
| Example 6 | 0.01 | 0.00 | 0.00 | 0.00 | 0.00 |
| Example 5 | 0.01 | 0.01 | 0.00 | 0.00 | 0.00 |
| Example 3 | 0.02 | 0.02 | 0.02 | 0.02 | 0.02 |
| Example 2 | 0.15 | 0.13 | 0.11 | 0.09 | 0.08 |
| Example 1 | 0.09 | 0.08 | 0.06 | 0.05 | 0.05 |
| Example 4 | 0.01 | 0.01 | 0.01 | 0.00 | 0.00 | b) Cured Samples
Procedure for Sample Preparation:

Two slides were cleaned with ethanol. Aluminum film (0.03 mm) was cut so that it covered the two edges of the slides to an extent of approximately 15 mm. The thickness was measured with a thickness gauge. Thereafter the film sections were placed on the edge of the slide on both sides. On an analytical balance, 0.5003 g (100%) of the sample (the corresponding dispersion according to the example) was weighed out in an aluminum boat, and 0.0252 g (5.03%) of dibenzoyl peroxide was added. The components were mixed thoroughly using a glass rod. In a weighing boat, 0.0041 g (0.82%) of N,N-dihydroxyethyl-p-toluidine was weighed out and likewise mixed in thoroughly. When the mixture slowly became viscous, it was carefully applied to the slide using a glass rod, and covered with another slide. The two slides were pressed against one another until the resin had cured.

The amounts of resin, accelerant (diethylol-p-toluidine) and dibenzoyl peroxide powder used are summarized in table 3.

TABLE 3

| Sample | Resin [g] | Curative [g] | Accelerant [g] | Film thickness μm |
|---|---|---|---|---|
| Example 6 | 0.5009 g | 0.0250 g | 0.0041 g | 180-300 |
| Example 1 | 0.5010 g | 0.0255 g | 0.0043 g | 300 |
| Example 3 | 0.5010 g | 0.0252 g | 0.0042 g | 180-300 |
| Example 2 | 0.5023 g | 0.0252 g | 0.0042 g | 180-300 |
| Example 1 | 0.5035 g | 0.0252 g | 0.0041 g | 180-300 |
| Example 5 | 0.5001 g | 0.0250 g | 0.0041 g | 180-300 |
| Example 5 | 0.5008 g | 0.0253 g | 0.0041 g | 300 |
| Example 4 | 0.5003 g | 0.0252 g | 0.0041 g | 180-300 |

The spectra obtained for the cured samples are shown in the attached FIG. 2. For clarity the absorbance values for selected wavelengths are set out in table 4.

TABLE 4

| | Wavelength [nm] | | | | |
|---|---|---|---|---|---|
| Sample | 400 | 500 | 600 | 700 | 800 |
| Example 6 | 0.673 | 0.359 | 0.236 | 0.192 | 0.180 |
| Example 1 | 0.092 | 0.063 | 0.047 | 0.040 | 0.036 |
| Example 3 | 0.334 | 0.240 | 0.194 | 0.172 | 0.159 |
| Example 2 | 0.189 | 0.146 | 0.123 | 0.114 | 0.112 |
| Example 1 | 0.206 | 0.133 | 0.106 | 0.092 | 0.081 |
| Example 5 | 0.221 | 0.244 | 0.235 | 0.238 | 0.236 |
| Example 5 | 0.061 | 0.061 | 0.057 | 0.057 | 0.057 |
| Example 4 | 0.142 | 0.102 | 0.080 | 0.069 | 0.064 |

The absorbance values are between 0.03 and a maximum of 0.7 units. Particular preference is given to the range up to a maximum of 0.2 units.

In the above samples, glass beads were used as spacer in the course of measurement, leading to scattered light. Even better values can be obtained if no glass bead sample spacers are used when carrying out measurement, as shown in table 4A.

TABLE 4A

| | Wavelength [nm] | | | | |
|---|---|---|---|---|---|
| Sample | 400 | 500 | 600 | 700 | 800 |
| Example 1 | 0.104 | 0.034 | 0.009 | −0.004 | −0.009 |
| Example 3 | −0.014 | −0.023 | −0.026 | −0.029 | −0.030 |
| Example 2 | 0.140 | 0.123 | 0.117 | 0.112 | 0.115 |
| Example 6 | −0.014 | −0.023 | −0.026 | −0.029 | −0.030 |
| Example 5 | 0.007 | 0.003 | 0.002 | 0.001 | 0.002 |
| Example 4 | −0.027 | −0.029 | −0.028 | −0.030 | −0.030 |

4. Viscosity

Figure 3:
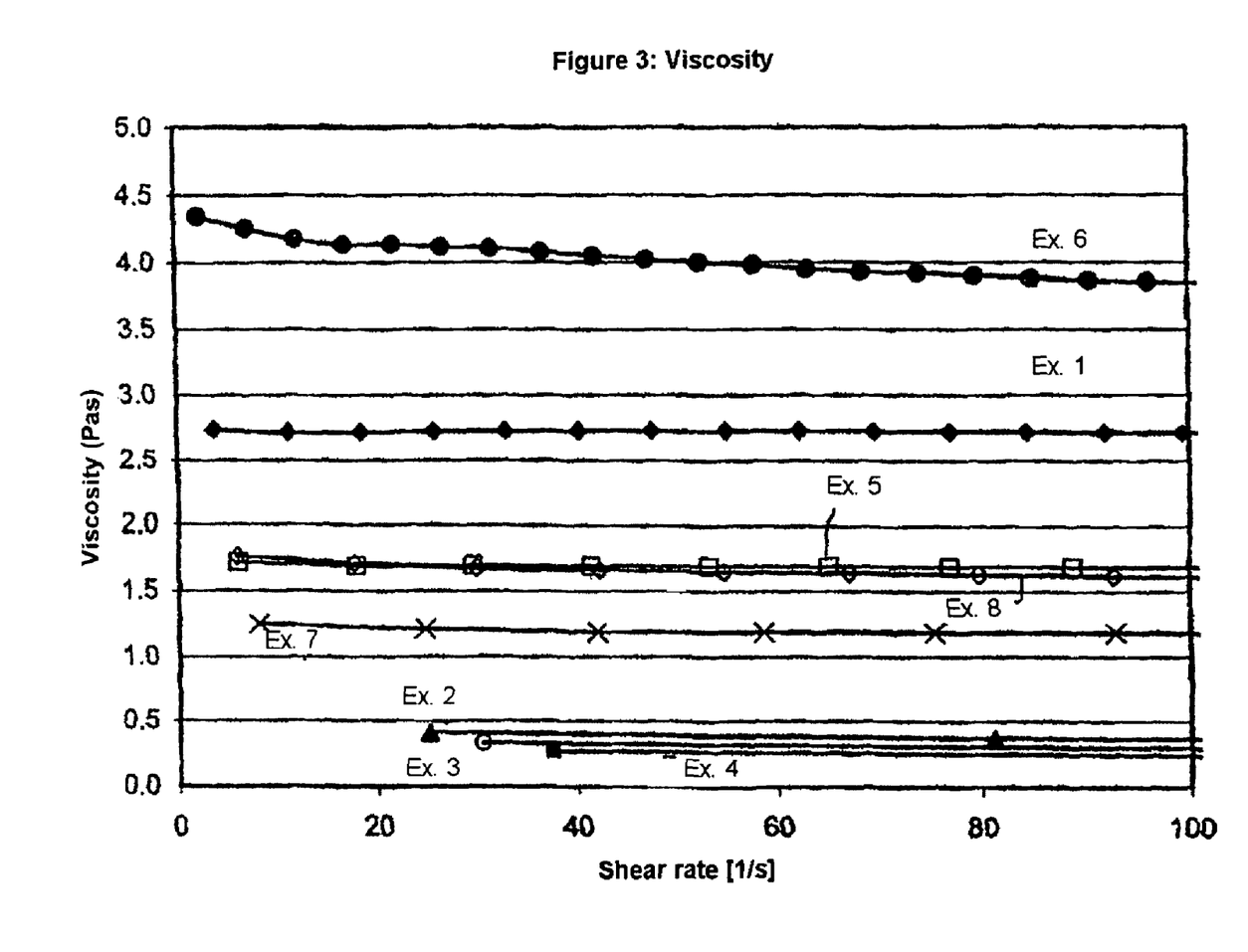

For the determination of the viscosity the samples were subjected in neat form to measurement with a Bohlin CVO rheometer in the shear-rate range from 2.3 to 100 s$^{-1}$ using a plate/cone test element. The cone geometry was 4°/40 mm, the shear-rate gradient, 100. The temperature was between 25° C. and 26° C. The results are shown in the attached FIG. 3. For clarity the viscosities at 40, 60, 80 and 100 s$^{-1}$ are compared in table 5.

TABLE 5

| Example 1 (Krasol 5000, 11 000 rpm) | $\gamma$ (1/s) | 40.34 | 62.32 | 84.54 | 106.85 |
|---|---|---|---|---|---|
| | $\eta$ (Pas) | 2.73 | 2.73 | 2.72 | 2.71 |

TABLE 5-continued

| | | | | | |
|---|---|---|---|---|---|
| Example 2 (Krasol 3000, 11 000 rpm) | γ (1/s) | — | — | 81.20 | — |
| | η (Pas) | — | — | 0.37 | — |
| Example 4 (Krasol 2000, 11000 rpm) | γ (1/s) | 37.50 | — | — | 130.00 |
| | η (Pas) | 0.27 | — | — | 0.23 |
| Example 3 (Krasol 2000, 5000 rpm) | γ (1/s) | 30.50 | — | — | 102.00 |
| | η (Pas) | 0.33 | — | — | 0.30 |
| Example 5 | γ (1/s) | 41.50 | 65.10 | 88.80 | 101.00 |
| | η (Pas) | 1.69 | 1.69 | 1.69 | 1.69 |
| Example 6 | γ (1/s) | 42.00 | 63.20 | 79.60 | 102.00 |
| | η (Pas) | 4.05 | 3.95 | 3.90 | 3.84 |
| Example 7 | γ (1/s) | 42.00 | 58.60 | 75.40 | 92.80 |
| | η (Pas) | 1.19 | 1.19 | 1.19 | 1.19 |
| Example 8 | γ (1/s) | 42.30 | 54.70 | 79.80 | 106.00 |
| | η (Pas) | 1.66 | 1.65 | 1.63 | 1.61 |

5. Impact Strength Testing in Accordance with ISO 180/U

Identification of Materials Tested:

| | |
|---|---|
| Specimen 1: | example 1 (Krasol 5000, 11 000 rpm) |
| Specimen 2: | example 2 (Krasol 3000, 11 000 rpm) |
| Specimen 3: | example 3 (Krasol 2000, 5000 rpm) |
| Specimen 4: | example 4 (Krasol 2000, 11 000 rpm) |
| Specimen 5: | example 5 |
| Specimen 6: | example 6 |
| Specimen 7: | Comparative - POEMA |

Description of Qualities:

The specimens had a length of l=80±2 mm and were unnotched. The width was w=6.0±0.2 mm, the thickness h=4.0±0.2 mm.

Test Apparatus:

The test apparatus employed was the Zorn Stendal PSW4J pendulum impact unit. The speed at which the pendulum hammer struck the center of the sample was 2.9 m/s. The nominal energy of the pendulum was 1 joule.

Production of Specimens:

For the production, an aluminum mold with an internal PTFA film was used, which is closed and can be disassembled again by means of glass plates at pairs of opposing sides. In the drying cabinet preheated at 80° C., WTB Binder FD, the material introduced into the mold was polymerized at T=80° C. for 2 h. Subsequently the resulting specimen was removed from the mold and cured in the drying cabinet at T=120° C. for 20 h. In the case of the POEMA specimen, a heating temperature of T=70° C. was selected for polymerization. For the polymerization, the material was admixed with 0.2% of AIBN, azoisobutyronitrile, before the mold was filled, and the components were mixed. The quantities are compiled in table 6.

TABLE 6

| Specimen | Amount of resin [g] | Amount of AIBN [g] |
|---|---|---|
| 1 (Krasol 5000, 11 000 rpm) modifier | 5.0192 | 0.0151 |
| 2 (Krasol 3000, 11 000 rpm) modifier | 5.0231 | 0.0109 |
| 3 (Krasol 2000, 5000 rpm) modifier | 5.0801 | 0.0109 |
| 4 (Krasol 2000, 11 000 rpm) modifier | 5.1023 | 0.0101 |
| 5 | 5.1711 | 0.0110 |
| 6 | 5.0618 | 0.0132 |
| 7 (Comparison: POEMA) | 10.0140 | 0.0200 |

The number of specimens tested was 1.

Pretreatment conditions: standard conditions DIN 50014-23/50-2 (23° C., 50% rh)

Types of Failure Observed:

POEMA failed as complete fracture (C). In comparison, only partial fracture (P) was observed for specimens 5 and 6. The results of measurement are shown in table 7

TABLE 7

| | Impact strength: | | |
|---|---|---|---|
| Specimen | Fracture energy E [J] | Impact strength aiU [J/cm$^2$] | Failure mode |
| 1 (Krasol 5000, 11 000 rpm) | 0.26 | 0.11 | C |
| 5 | 0.30 | 0.13 | P |
| 6 | 0.14 | 0.06 | P |
| Comparison: POEMA | 0.02 | 0.01 | C | where E = energy in joules consumed in fracturing the specimen; aiU = impact strength.

6. Particle Size

The resin samples were diluted 1:10 with methyl methacrylate and stirred for 2 minutes for homogenization. Using a glass pipette, the samples were transferred to a glass cuvette (fill level: 10-15 mm) and placed in a Malvern nanosizer. After a conditioning phase of 2-3 minutes, the measurements were carried out in the instrument's automatic mode. The results are summarized in table 8 below.

TABLE 8

| Sample | Particle size [nm] | Distribution width [nm] |
|---|---|---|
| Example 1 | 6.2 | 1.5 |
| Example 2 | 4.4 | 1.5 |
| Example 3 | 3.2 | 1.4 |
| Example 4 | 4.3 | 1.7 |
| | 2.3 | 1.3 |
| Example 4/filtered | 3.2 | 1.5 |
| | 6.1 | 3.1 |
| Example 6 | 3.5 | 1.5 |
| Example 8 | 5.0 | 2.1 |

7. Tensile Shear Strength

The bonding test took place in accordance with DIN EN 1465. It was carried out using an "Inspekt 20 desk" tensile testing machine from Hegewald&Peschker Mess-und Prüftechnik GmbH.

The samples were cured with the aid of a test plate on adherends of steel, aluminum and wood in dimensions of 25×100×1.5 mm abraded beforehand with emery paper, as follows:

| Step | Parts by weight | Component |
|---|---|---|
| I | 100 | Dispersion |
| II | 0.82 | DEPT[1] |
| III | 5.00 | DBPO[2] |

[1]N,N-bis (2-hydroxyethyl)-p-toluidine
[2]Dibenzoyl peroxide

A tension speed of 15 mm/min was utilized for the tests.

The comparison substances used were pure phenyloxyethyl methacrylate (POEMA) and three commercial acrylate adhesives.

TABLE 9

Tensile shear strength

| | Bond strength [MPa] | | |
|---|---|---|---|
| | Steel | Al | Wood |
| Example 7 (t32) | 1.1 | 1.0 | 0.8 |
| Example 6 (t-33) | 1.8 | 1.6 | 0.7 |
| Example 5 (t-34) | 5.4 | 8.1 | n.d.[1] |
| Example 1 (t-37) | 10.9 | n.d. | n.d. |
| Comparative example 1 pure POEMA | 1.7 | 1.4 | 1.4 |
| Comparative example 2 Cyanacrylate adhesive[2] | 11.0 | — | — |
| Comparative example 3 Cyanacrylate adhesive[3] | 5.7 | — | — |
| Comparative example 4 Acrylate adhesive[4] | 14.9 | — | — |

[1] n.d. = not determined
[2] Sico Met 8400 ® from Sichel Werke GmbH (Henkel), one-component Cyanacrylate adhesive
[3] Pattex Blitz Gel ® from Pattex KgaA
[4] Agomet$^{F252}$® from Agomer GmbH, acrylate-based structural adhesive with curative. Contains methyl methacrylate and dibenzoyl peroxide (curative).

Particularly noteworthy are the results obtained with the dispersions from example 5 (t-34) and example 1 (t-37). On the comparable backing, these possess a much better bond strength than POEMA, the pure reactive diluent. The dispersion from example 2 offers comparable results to those of POEMA, at least on steel and aluminum.

The best results were obtained with the dispersion from example 1: the tensile shear strength in this case was 10.9 MPa on steel. In comparison, the sample achieved more than 70% of the bond strength of the best market product from comparative example 4 (14.9 MPa).

All of the examples and results for characterization are set once again in the overall overview below, in table 10.

TABLE 10

Overview of tests

| Expression | | Molar mass | mmol OH/g | | Formula | | | | | | | |
|---|---|---|---|---|---|---|---|---|---|---|---|---|
| | | | | | Ex. 1 | Ex. 2 | Ex. 3 | Ex. 4 | Ex. 5 | Ex. 6 | Ex. 7 | Ex. 8 |
| Isocyanate | IPDI | 221.28 | | Mass [g] | 4.250 | 4.250 | 4.250 | 4.250 | 5.495 | | 2.020 | 1.720 |
| | | | | Molar mass NCO [mol] | 0.038 | 0.038 | 0.038 | 0.038 | 0.050 | 0.000 | 0.018 | 0.016 |
| | TMDI | 210.27 | | Mass [g] | | | | | | 4.220 | | |
| | | | | Molar mass NCO [mol] | 0.000 | 0.000 | 0.000 | 0.000 | 0.000 | 0.040 | 0.000 | 0.000 |
| Reactive diluent | POEMA | 206.2 | | Mass [g] | 30.198 | 30.198 | 30.198 | 30.198 | 32.200 | 31.470 | 30.890 | 30.760 |
| | | | | Molar mass [mol] | 0.146 | 0.146 | 0.146 | 0.146 | 0.156 | 0.153 | 0.150 | 0.149 |
| Polyol | Krasol 5000 | 4638 | 0.421 | Mass [g] | 24.972 | | | | | | | 27.131 |
| | | | | Molar mass OH [mol] | 0.011 | 0.000 | 0.000 | 0.000 | 0.000 | 0.000 | 0.000 | 0.011 |
| | Krasol 3000 | 2650 | 0.737 | Mass [g] | | 14.265 | | | | | | |
| | | | | Molar mass OH [mol] | 0.000 | 0.011 | 0.000 | 0.000 | 0.000 | 0.000 | 0.000 | 0.000 |
| | Krasol 2000 | 2160 | 0.887 | Mass [g] | | | 11.853 | 11.853 | | 28.399 | | |
| | | | | Molar mass OH [mol] | 0.000 | 0.000 | 0.011 | 0.011 | 0.000 | 0.025 | 0.000 | 0.000 |
| | PTHF 2000 | 2000 ± 50 | 0.999 | Mass [g] | | | | | 27.847 | | | |
| | | | | Molar mass OH [mol] | 0.000 | 0.000 | 0.000 | 0.000 | 0.028 | 0.000 | 0.000 | 0.000 |
| | Baycoll 5035 | 4800 | 0.624 | Mass [g] | | | | | | | 27.130 | |
| | | | | Molar mass OH [mol] | 0.000 | 0.000 | 0.000 | 0.000 | 0.000 | 0.000 | 0.017 | 0.000 |
| | BD 1000 | 1000 | | Mass [g] | | | | | | | | 0.526 |
| | | | | Molar mass OH [mol] | 0.000 | 0.000 | 0.000 | 0.000 | 0.000 | 0.000 | 0.000 | 0.001 |
| Diol | 1,4-butanediol | 90.12 | | Mass [g] | 0.535 | 0.535 | 0.535 | 0.535 | 0.000 | 0.611 | | 0.000 |
| | | | | Molar mass OH [mol] | 0.012 | 0.012 | 0.012 | 0.012 | 0.000 | 0.014 | 0.000 | 0.000 |

TABLE 10-continued

Overview of tests

| Expression | | Molar mass | mmol OH/g | | Formula Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|
| Stabilizer | Bis-MPA | 134.13 | | Mass [g] | | | | | | | | 0.076 |
| | | | | Molar mass [mol] | 0.000 | 0.000 | 0.000 | 0.000 | 0.000 | 0.000 | 0.000 | 0.001 |
| | AMP 90 | 89.1 | | Mass [g] | | | | | | | | 0.058 |
| | | | | Molar mass [mol] | 0.000 | 0.000 | 0.000 | 0.000 | 0.000 | 0.000 | 0.000 | 0.001 |
| Catalyst | DBTDL | 631.55 | | Mass [g] | 0.032 | 0.032 | 0.032 | 0.032 | 0.037 | 0.010 | 0.027 | 0.018 |
| | | | | Molar mass [mol] | 5.13E−05 | 5.13E−05 | 5.13E−05 | 5.13E−05 | 5.81E−05 | 1.52E−05 | 4.24E−05 | 2.91E−05 |
| Capping reagent | HEMA | 130.1 | 0.97 | Mass [g] | 2.030 | 2.030 | 2.030 | 2.030 | 2.800 | 0.054 | 0.072 | 0.054 |
| | | | | Molar mass OH [mol] | 0.002 | 0.002 | 0.002 | 0.002 | 0.003 | 0.000 | 0.000 | 0.000 |
| Stirring speed (rpm) | | | | | 11 000 | 11 000 | 5000 | 11 000 | 11 000 | 11 000 | 11 000 | 12 000 |
| UV liquid (absorbance) | 400 nm | | | | 0.09 | 0.15 | 0.02 | 0.01 | 0.01 | 0.01 | 0.22 | 0.37 |
| | 500 nm | | | | 0.08 | 0.13 | 0.02 | 0.01 | 0.01 | 0 | 0.22 | 0.36 |
| | 600 nm | | | | 0.06 | 0.11 | 0.02 | 0.01 | 0 | 0 | 0.2 | 0.31 |
| | 700 nm | | | | 0.05 | 0.09 | 0.02 | 0 | 0 | 0 | 0.19 | 0.28 |
| | 800 nm | | | | 0.05 | 0.08 | 0.02 | 0 | 0 | 0 | 0.18 | 0.24 |
| UV solid (absorbance) | 400 nm | | | | 0.10 | 0.14 | −0.01 | −0.03 | 0.01 | 0.11 | | |
| | 500 nm | | | | 0.03 | 0.12 | −0.02 | −0.03 | 0.00 | 0.01 | | |
| | 600 nm | | | | 0.01 | 0.12 | −0.03 | −0.03 | 0.00 | −0.02 | | |
| | 700 nm | | | | 0.00 | 0.11 | −0.03 | −0.03 | 0.00 | −0.02 | | |
| | 800 nm | | | | −0.01 | 0.12 | −0.03 | −0.03 | 0.00 | −0.03 | | |
| Viscosity [Pas] | | | | | 2.73 | 0.37 | 0.27 | 0.33 | 1.69 | 4.05 | 1.19 | 1.66 |
| Shear rate [1/s] | | | | | 40.34 | 81.20 | 37.50 | 30.50 | 41.50 | 42.00 | 42.00 | 42.30 |
| Impact strength [J/cm$^2$] | | | | | 0.11 | 0.02 | 0.02 | 0.02 | 0.13 | 0.06 | | |
| Fracture pattern | | | | | complete fracture | complete fracture | complete fracture | complete fracture | partial fracture | partial fracture | | |
| Particle size [nm] | | | | | 6.20 | 4.40 | 3.20 | 3.98 | | 3.50 | | 5.00 |
| Distribution width [nm] | | | | | 1.50 | 1.50 | 1.40 | 1.90 | | 1.50 | | 2.10 |
| Molar ratio NCO:OH | | | | | 1.72 | 1.72 | 1.72 | 1.72 | 1.78 | 1.04 | 1.08 | 1.25 |
| Molar ratio OH-short:OH-long | | | | | 1.13 | 1.13 | 1.13 | 1.13 | 0.00 | 0.54 | 0.00 | 0.00 |
| Xn calculated according to (1 + r)/(1 − r) | | | | | 3.79 | 3.79 | 3.79 | 3.79 | 3.55 | 56.78 | 26.39 | 9.12 |

For the explanation of the abbreviations, refer to section 1 - Chemicals

The invention claimed is:

1. A nonaqueous transparent dispersion of polyurethane (meth)acrylate particles in a diluent substance containing at least one ethylenic double bond, wherein the dispersion is obtained by reacting in the diluent substance a polyisocyanate with at least one polyol and a nucleophilically functionalized (meth)acrylic ester comprising a nucleophilic functional group which reacts with free isocyanate groups, characterized in that the polyurethane(meth)acrylate particles have an average diameter of less than 40 nm and the diluent substance does not participate in the reaction of the polyisocyanate with the at least one polyol and the nucleophilically functionalized (meth)acrylic ester.

2. The dispersion of claim 1, characterized in that the polyurethane(meth)acrylate particles have an average diameter of less than 20 nm.

3. The dispersion of claim 1, characterized in that the polyurethane(meth)acrylate particles have an average diameter of less than 10 nm.

4. The dispersion of claim 1, characterized in that the fraction of polyurethane (meth)acrylate particles is 50-70% by weight, based on the total weight of the dispersion.

5. The dispersion of claim 1, characterized in that the diluent substance is a (meth)acrylate.

6. The dispersion of claim 5, characterized in that the (meth)acrylate is selected from the group consisting of methyl methacrylate and 2-phenoxy ethyl methacrylate.

7. The dispersion of claim 1, characterized in that the polyisocyanate is selected from the group consisting of aliphatic and cycloaliphatic diisocyanates.

8. The dispersion of claim 1, characterized in that the molar ratio of the isocyanate groups to the hydroxyl groups from the polyol is 1.03 to 1.7.

9. The dispersion of claim 1, characterized in that the polyol is a high molecular weight polyol having a weight-average molecular weight of >500 to 5000 g/mol.

10. The dispersion of claim 9, characterized in that the high molecular weight polyol is selected from the group consisting of polybutadienediols, polytetrahydrofurans, and trifunctional polypropylene ether polyols formed from propylene oxide, ethylene oxide, and glycerol.

11. The dispersion of claim 9, obtained by using, further to the high molecular weight polyol, a low molecular weight polyol having a molar mass of 50-500 g/mol.

12. The dispersion of claim 11, characterized in that the low molecular weight polyol is selected from the group consisting of 1,4-butanediol and 1,3-propanediol.

13. The dispersion of claim 11, characterized in that the molar ratio of the OH groups of the low molecular weight polyol to the OH groups of the high molecular weight polyol is 0.3 to 1.2.

14. A dispersion-based adhesive or an ingredient of a dispersion-based adhesive comprising the dispersion according to claim 1.

15. A cast glass or an ingredient of a cast glass comprising the dispersion according to claim 1.

16. An impact modifier in molding compounds, adhesives, or cast glasses comprising the dispersion according to claim 1.

17. A molding obtained by curing a dispersion of claim 1.

18. A process for preparing a dispersion of polyurethane (meth)acrylate particles as described in claim 1, in which a polyisocyanate is reacted with at least one polyol and a nucleophilically functionalized (meth)acrylic ester comprising a nucleophilic functional group which reacts with free isocyanate groups in a diluent substance containing at least one ethylenic double bond in a stirred tank, characterized in that the reaction is carried out at a peripheral stirrer speed of at least 5 m/s, the ratio of stirrer diameter to vessel diameter being 0.3-0.80 and the distance of the stirrer from the base of the vessel being 0.25 to 0.5 times the stirrer diameter.

19. The process of claim 18, characterized in that the peripheral stirrer speed is at least 12 m/s.

20. The process of claim 18, characterized in that a dispersing disk is used as stirrer.

21. The process of claim 18, characterized in that the process is performed in the presence of a catalyst selected from tertiary amines and/or organotin compounds.

22. The process of claim 21, wherein the catalyst is dibutyltin dilaurate.

* * * * *